United States Patent [19]
Zimmerman et al.

[11] Patent Number: 5,677,796
[45] Date of Patent: Oct. 14, 1997

[54] LUNEBERG LENS AND METHOD OF CONSTRUCTING SAME

[75] Inventors: Kurt A. Zimmerman, Atlanta; Donald L. Runyon, Duluth, both of Ga.

[73] Assignee: EMS Technologies, Inc., Norcross, Ga.

[21] Appl. No.: 519,577

[22] Filed: Aug. 25, 1995

[51] Int. Cl.$^6$ ............... G02B 9/00; G02B 3/02; H01Q 15/08
[52] U.S. Cl. ............ 359/654; 359/664; 359/720; 343/911 R; 343/911 L
[58] Field of Search .................. 359/652, 654, 359/664, 720; 343/911 R, 911 L

[56] References Cited

U.S. PATENT DOCUMENTS 3,133,285   5/1964   Jordan et al. .................. 359/654

OTHER PUBLICATIONS

IEEE Transactions on Geoscience and remote Sensing, "Effective Dielectric Constant Of A Medium With Spherical Inclusions," Jan., 1992 vol. 30, pp. 184–186.

J. Opt. Soc. Am, "Index Profies For Generalized Luneberg Lenses And Their Use In Planar Optical Waveguides" Aug. 1977, vol. 67, No. 8, pp. 1010–1014.

IEEE Transactions on Geoscience and Remote Sensing, "A Multiple Scattering Solution For The Effective Permittivity of a Sphere Mixture", Mar., 1990, vol. 2, No. 28, No. 2, , pp. 207–214.

Procedings of the I.R.E., "Isotropic Artificial Dielectric," May, 1952, vol. 40, pp. 574–587.

IEEE Transactions on Antennas and Propagation, "Dielectric Properties of Mixtures", Nov. 1965, vol. Ap–13, No. 6, pp. 943–947.

IEEE Transactions on Geoscience and Remote Sensing, "Effective Permittivity of Dielectric Mixtures," Jul., 1988, vol. 26, pp. 420–429.

Georgia Institute of Technology, USA, Naval Ocean Systems Center, USA, "A Multiple–Beam Multiple–Frequency Spherical Lens Antenna Sytsem Providing Hemispherical Coverage," pp. 394–398 (Apr. 1989).

IRE Transactions on Antennas and Propagation, "Generalizations of Spherically Symmetric Lens," (Oct. 1959) Bell Telephone Labs, Inc., Murray Hill, N.J., pp. 342–345.

IRE Transactions on Antennas and Propatation, G.D.M. Peeler and H.P. Coleman, "Microwave Stepped–Index Luneberg Lens," Apr., 1958, pp. 2027–207.

Journal of Applied Physics, Samuel P. Morgan, "General Solution of the Luneberg Lens Problem", vol. 29, No. 9, Sep., 1958, pp. 1358–1368.

J. Opt. Soc. Am. W.H. "Inhomogeneous Optical Waveguide Lens Analysis," Aug., 1977, vol. 67, No. 8, pp. 104–1009.

IEE Proceedings, "Meniscus–Lens–Corrected Corrugated Horn: A Compact Feed For A Cassegrain Antenna," vol. 131, pt. H. No. 6, Dec., 1984, pp. 390–394.

Edward A. Wolff, "Antenna Analysis," Jan., 1967, pp. 492–499.

Jurgen R. Meyer–Arendt, M.D. "Introduction to Classical and Modern Optics," 1972, p. 24.

Constantine A. Balanis, "Antenna Theory Analysis and Design" Reflectors and Lens Antennas, pp. 652–654.

*Primary Examiner*—Georgia Y. Epps
*Assistant Examiner*—Evelyn A. Lester
*Attorney, Agent, or Firm*—Jones & Askew, LLP

[57] ABSTRACT

An improved spherical gradient lens and a method of fabricating same. A uniform sphere of a material such as high density irradiated polystyrene or a methylpentene copolymer in the polyolefin family having a uniform relative dielectric constant is provided. A plurality of radially extending holes are formed therein, for example by drilling, the holes having a predetermined cross sectional geometry along axes extending radially from the center of the sphere. The geometry of holes is selected to control the resultant local density of material, and thus the relative dielectric constant as a function of distance from the center of the sphere. Hole diameters are chosen so as to be small compared to the shortest wavelength of interest with which the lens will be used.

24 Claims, 5 Drawing Sheets

LUNEBERG LENS AND METHOD OF CONSTRUCTING SAME

TECHNICAL FIELD

The present invention relates to the art of fabricating lenses, and in particular is an improved method of fabricating spherical lenses of the type having continuously varying dielectric constants along a radius vector from the center of the lens, including the particular class known as Luneberg lenses.

BACKGROUND OF THE INVENTION

Lenses are devices that alter the direction of travel of electromagnetic waves as they pass through them. The physical mechanism involves a change in the dielectric constant between adjacent media that cause electromagnetic radiation incident on a second media at an angle other than the perpendicular to have its direction of travel appear to be bent when passing into a medium of a different dielectric constant. Lenses are generally used to focus or defocus beams or parallel rays of incident radiation. Lenses in corrective eyeglasses, cameras, binoculars, and a number of other devices are familiar from everyday experience. In addition to lenses for use at optical frequencies of electromagnetic radiation, lenses are useful and practical for high frequency electromagnetic waves used in such as microwave frequencies, and extending down into the gigahertz range. As the frequency gets lower, the wavelength gets sufficiently long so that lenses tend to become impractical and reflecting devices tend to be used for focusing and defocusing radiation.

The present invention relates to the general class of lenses known as gradient lenses. A gradient lens is a device for which the dielectric constant of the material from which the lens is constructed changes as a ray representing energy direction of propagation passes through the lens. Typical lenses from everyday experience tend to be constructed of materials having unvarying dielectric constants. Gradient lenses have a number of very useful properties that have been known for many years. The knowledge of the properties of gradient lenses has been derived from mathematical analysis of the behavior of radiation as it passes through a gradient lens. The practical problem with gradient lenses has been constructing physical devices that actually have the desired variable dielectric constant characteristics. Thus, while the analysis of the behavior of a gradient lens is relatively straightforward, physical fabrication of devices having smoothly varying dielectric constants along a given direction has proven to be quite difficult.

A particular type of gradient lenses is one known as the Luneberg lens. The Luneberg lens is a spherical lens with a particular dielectric constant gradient. A Luneberg lens is very useful for providing antennas with very wide fields of view. In particular, an ideal Luneberg lens will focus parallel rays of electromagnetic radiation incident upon the circular projection of one hemisphere to a single point on the surface of the opposing hemisphere. The particular gradient characteristic for an ideal Luneberg lens is that the dielectric constant varies with the distance along any radius vector extending from the center of the sphere so that the dielectric constant at the center is twice that at the surface of the sphere. In particular, the dielectric constant $\epsilon_r$ at any given point r distance from the center of a sphere of radius R is $\epsilon_r = 2-(r/R)^2$. The relative dielectric constant at the surface of the sphere should match the dielectric constant of the surrounding medium in which the incident or exiting rays are traveling.

Thus, a typical application for a Luneberg lens in air requires the dielectric constant at the surface of the sphere to essentially be unity, and that at the center of the sphere to be two. Since the difference between the permitivity of air and the permitivity of free space is, as a practical matter, negligible, a Luneberg lens having the two to one gradient characteristic described above is also appropriate for use in a vacuum as well as air.

The more general type of Luneberg lens has also been well known in the literature for a number of years. The more general case is one for which the focal point of the lens is placed away from the spherical surface. In such a lens the dielectric constant at the center of the sphere is less than two. The more general case of a Luneberg lens was mathematically described in a paper "General Solution of the Luneberg Lens Problem" by Samuel P. Morgan published in volume 29, number 9 (September, 1958) of the Journal of Applied Physics.

When it comes to implementation of real spherical gradient lenses, several practical limitations arise. The attainment of a continuously varying dielectric medium with spherical symmetries is a difficult manufacturing challenge using natural dielectrics. Natural dielectrics are media where the feature sizes of the constituent materials are extremely small (e.g., molecular) compared to operating wavelength. To this end, physical implementations of lenses that approximate the ideal Luneberg characteristic have, in the past, been constructed using piecewise approximations. In other words, concentric layers or shells of materials of stepwise decreasing dielectric constants are added one over the other so that a stepwise approximation of the desired smoothly varying dielectric constant characteristic is obtained.

Such lenses are normally constructed by fabricating two hemispherical shells for each layer and gluing pairs of these over the sphere constructed from assembling the previous layers. Each hemispherical layer is fabricated from a custom density foam block or cast shape. Such construction leads to bond line discontinuities, i.e., discontinuities within the same layer where the surfaces of the shells are bonded together. Additionally, there are difficulties with maintaining the dimensional accuracy of the shells and the concentricity of the layers.

Generally speaking, the cruder the approximation (i.e., the smaller number of layers) the worse the side effects of the deviation from the ideal Luneberg lens characteristic become. In particular, undesired side lobes in the gain pattern become problematic as the gain increases. Since most applications for a Luneberg lens are wide field of view applications and antennas constructed using such lenses generally exhibit a high gain characteristic, they are therefore particularly sensitive to the deviations from the ideal caused by the stepwise approximation of the dielectric constant characteristics internal to the lens. This is particularly problematic for a Luneberg lens since the main advantage of an ideal Luneberg lens is its superior focusing characteristics as contrasted to a constant $\epsilon_r$ spherical lens. The foams used in creating layered approaches to a Luneberg lens can be of several types. Some, like closed cell styrene foam (i.e., Styrofoam used in disposable coolers) will explode when exposed to a vacuum.

More recently, a new class of foam has been introduced that uses the same principal of varying the amount of air bubbles entrapped in a matrix to vary the density, and thus the dielectric constant. This new class includes microbubbles of air encapsulated in glass, with the glass enclosed air bubbles being fixed in a solid resin matrix. The glass encapsulation of the air bubbles overcomes the problem of explosion in a vacuum. However, this material tends to be more lossy than gas expanded bulk material. Lens fabrication using such materials still requires layers to approximate a continuous gradient.

While there are a number of applications in which the present invention is usable, one of the principle motivations for the present invention was the desire to fabricate a Luneberg lens that is usable in extraterrestrial applications, particularly geostationary satellites and satellites in low earth orbits. The earth subtends 17° the field of view of a geostationary satellite, and as satellite orbits become lower the field of view necessary to cover significant portions of the earth increases. Thus, a Luneberg lens, with its wide field of view, is a desirable device for creating a well focused antenna.

Thus, there is a need in the art for a fabricatable spherical lens that provides an excellent approximation to the ideal Luneberg lens dielectric constant gradient characteristic, that is usable in terrestrial and extraterrestrial applications, and is lightweight for a given size sphere.

SUMMARY OF THE INVENTION

The present invention provides the desired characteristics for a spherical lens and a particular Luneberg lens, that heretofore have not been accomplished by the prior art. The present invention encompasses both the method of constructing the lens as well as the resulting lens itself.

Generally stated, the lens of the present invention is a spheroid of substantially uniform material, which material has a uniform dielectric constant throughout. A plurality of hollowed volumes, i.e., holes, are disposed within the spheroid, each of the hollowed volumes having a respective longitudinal axis extending radially from the center of the sphere toward the surface. Preferably, the cross sectional area of the holes in planes perpendicular to their respective longitudinal axes, are either constant, or monotonically increasing (or both over various ranges), as one proceeds from the center of the spheroid toward its surface. This allows the holes to be fabricated using real physical drilling or boring devices. Generally stated, the result of this structure is that the hole density, for any given spheriodal surface between the center of the physical spheroid and its outer surface, varies in some predetermined manner with the radial distance from the center of the spheroid. Since the density of the material is directly related to the dielectric constant, an increasing percentage of surface area occupied by the holes vis-a-vis surface area occupied by the starting material causes the dielectric constant to correspondingly decrease. This approach is valid when the features size, or hole size, is smaller than the wavelength of the propagating radiation in the resulting effective medium.

As of the filing of this specification, two materials have been identified by the inventors as constituting alternates for a best mode of practicing the present invention. The first such material is a high density irradiated polystyrene material from which air bubbles have been excluded during the manufacturing process. Such material is currently manufactured by Dupont Corporation and sold under the trademark Rexolite. Dupont Rexolite has a dielectric constant of approximately 2.5. The other material identified by the inventors is a methylpentene copolymer in the polyolefin family known as TPX. TPX is a moldable thermoplastic having a dielectric constant of approximately 2.1.

For most materials, the resultant dielectric constant (on a macro scale) at any point within the sphere can be determined from the fraction of the area of a spherical shell that is occupied by holes at any given radial distance from the center. For most materials, it is believed that the dielectric constant varies proportionally with density, at least to a good first order approximation. Thus, preferred forms of the present invention have been designed that are based on the assumption that the dielectric constant varies proportionally with the density. It is believed that a more rigorous description of dielectric constant as a function of density may lead to a somewhat more complex description, but this can be accommodated within the scope of the present invention, as explained in greater detail herein below.

In constructing a Luneberg lens according to the present invention, the cross sectional area of the above mentioned holes varies as a function of the distance from the center of the spheroid to the center of the hole. In this specification, this variable is referred to as x and the cross sectional geometry of the holes will be expressed as functions of x. As will be apparent from the description to follow, in most (but not necessarily all) embodiments of the present invention the cross sectional geometry of the holes will be circular at each point along the x axis in cross sections perpendicular to the x axis. This is because the radius of the hole is expressed as a function of x in Cartesian coordinates. In other words, the geometry of the hole may be determined by viewing a graph of the function of x. Mentally rotating the curve of the function 360° about the x axis gives a picture of the shape of the hole along the x axis.

In most instances, the variable x in the Cartesian coordinate system most conveniently used to define the hole geometry will be numerically identical to the variable r, the radius variable extending from the center of the spheroid used to construct the lens. As is described in greater detail herein below, the function of x defining the hole cross sectional geometry may be expressed as a summation of discrete values or as a continuous function.

One general form of the description of the whole geometry used in embodiments of the present invention is a generalized function of x in the following form:

$$F(x) = \sum_{i=0}^{i=n} b_i x^i$$

However, the inventors also believe that certain profiles in a form $F(x)=ax^n$, where n may be a noninteger value between 0 and 2 are useful.

One preferred form of the present invention is constructed based on the assumption that dielectric constant varies proportionally with density, and, thus, proportionally with the fraction of the area of each shell covered by holes as one proceeds radially outward from the center of the sphere. In such a preferred form, the radial distance y from the hole longitudinal axis to the edge of the hole is given by the expression $a(x)^2$, where x is a distance measured along the hole longitudinal axis from the center of the spheroid and a is a positive constant. Ideally, this cross sectional hole area characteristic would be applied along the entire distance of the hole axis from the center of the spheroid to the surface of the spheroid. However, it is physically impractical to have a multiplicity of such holes mathematically converging at the center. Therefore, in practical realizations of the lens, the above described characteristic for the hole radius as a function of spherical radius will be applied over a range of x from some value $x_0$, near but not at the center of the spheroid, to x=R, at the outer surface of the sphere.

The above formula gives the characteristic radius of the hole about the hole's longitudinal axis at a given radial distance from the center of the sphere. It thus is the equivalent of an expression of the cross sectional area of the hole as a function of radial distance from the center of the sphere.

Tests conducted by the inventors of the present invention indicate that for polystyrene and similar materials from which construction of embodiments of the present invention is contemplated, the dielectric constant tends to vary proportionally to density, i.e., mass per unit volume. Therefore, if a solid sphere of material having uniform density, and, thus, a uniform dielectric constant throughout, is used as the starting material, and holes are drilled from the surface of the sphere radially toward the center, it follows that the dielectric constant at any given radial distance from the center, i.e., at any mathematically determined "shell" within the sphere, may be determined by the fraction of the surface area of the shell that is occupied by holes. Therefore, the dielectric constant within such a drilled sphere at a point r distance units from the center may be expressed by:

$$\epsilon_r = 1 + (\epsilon_0 - 1)\left(1 - \frac{A_{holes}}{A_{sphere}}\right)$$

if the assumption that dielectric constant is a proportional function of density holds true. In this expression, $A_{holes}$ and $A_{sphere}$, the numerator and denominator, are, respectively, the total area occupied by holes at distance r from the center and the area of a sphere of radius r. Therefore, according to the present invention, gradient lenses can be constructed with controlled and differing gradients for the dielectric constant by appropriately selecting the rate at which the holes flare (i.e., the radius increases) as one proceeds toward the surface of the sphere. Furthermore, if it is determined that the relationship between dielectric constant is other than proportional, the contours of the holes may be appropriately adjusted to control the resultant dielectric constant gradient so that it has the desired characteristic.

The preferred embodiment of the method of the present invention includes the steps of providing a spheroid, having a predetermined radius R, of substantially uniform material having a uniform dielectric constant throughout. A drill bit is provided with a characteristic longitudinal axis and a predetermined cross sectional geometry in planes perpendicular to the longitudinal axis over a range from $x=x_0$ to $x=R$. The predetermined cross sectional geometry is a circle having radius y given by the formula $y=a(x)^2$. $x_0$ is a positive value that defines the physical tip end of the drill bit. This is a recognition of the impracticality of having a working drill bit with a tip radius that slowly vanishes to 0 in the form of a narrow parabola.

The drill bit is then used to drill a plurality holes normal to the surface of the sphere, thus making them extend radially toward the center. It is naturally desirable to make $x_0$ as small as possible. It is also within the scope of the present invention to provide the hollow volumes (i.e., the holes) using methodology other than drilling or boring. The inventors believe that laser ablation of material may be an effective way to practice the method of the present invention for material removal. Symmetric or non-circularly symmetric hole cross sections can be manufactured by casting a resin system around removable mandrels or by resin stereolithography. Additionally, it is not necessary that the functions described in the cross sectional area of the holes be mathematically continuous. It may be piecewise continuous and discontinuities can be employed to create acceptable approximations of the desired dielectric constant gradient characteristics. Furthermore, not all of the holes in the spherical material need to be provided to the same depth. It may advantageous, for both control of the gradient characteristics and for providing air paths for cooling, to drill a subset of the holes all the way to the center and others of the holes only part way to the center of the sphere. This is particularly true in cases where the center of the sphere would be destroyed if too many drilled holes were drilled thereto, but a better approximation of the desired gradient characteristics may be obtained by providing some of the holes that extend all the way to the sphere's center. The available design choices for percentage of holes drilled all the way to, or closer to the center will be determined in significant part by the physical characteristics of the material from which the sphere is constructed, particularly its frangibility.

As noted above, cross sectional area versus radius characteristics other than the parabolically shaped sides may be used for drill bits in practicing this method. The only practical limitation is that over the range between $x=0$ to $x=R$, the radius of the bit should either be constant, or monotonically increasing, so that the drill bit may be physically inserted and removed from the physical material without destroying the desired cross sectional characteristic.

For the sake of minimizing inhomogenieties, it is desirable to use known algorithms for distributing a large number of relatively small holes evenly on the surface of the spheroid. Such algorithms are known, for example, in the arts of applying dimples to golf balls and the design of geodesic structures. It is also desirable that the radius of the holes at the surface of the sphere (i.e., $x=R$) be small compared to the wavelength for the highest frequency of interest. Thus, for a spheroid of a given radius R, it is preferable to choose a and the number of holes so that the maximum value of y (the hole radius) is much less than the shortest wavelength of interest. This tends to minimize the inhomogenieties caused by the anisotropic characteristic that is introduced by the radially extending holes.

Because this specification describes holes formed radially in a sphere; it should be understood that expressions of hole geometry A are functions of x and, are mathematically identical to the same expression as a function of r, the distance from the center of a sphere.

Thus, it is an object of the present invention to provide a physical realization of a spherical gradient lens that very closely approximates the ideal gradient characteristics. The ideal gradient characteristics extend to the generalized Luneberg lens where the focal point is removed from the lens surface. In such lenses, the relative dielectric constant at the center of the sphere is less than two. In particular, it is an object of the present invention to provide a physical realization of a lens that very closely approximates the ideal or generalized Luneberg gradient characteristics for the dielectric constant within a sphere.

It is further an object of the present invention to provide an improved method of constructing a spherical gradient lens that employs a sphere of isotropic material of constant dielectric constant as a starting material and controls the gradient characteristic of the dielectric constant by drilling or boring holes radially towards the center of the sphere.

It is still a further object of the present invention to provide a physical implementation of a spherical gradient lens in which the variation of dielectric constant as a function of sphere radius is determined by a ratio of the surface area of the sphere occupied by holes that extend toward the center of the sphere to the surface area of solid material, at any selected radius from the center of the sphere.

It is still a further object of the present invention to provide an improved spherical gradient lens that may be constructed of any material that could be fabricated into a sphere of substantially uniform dielectric constant characteristic and repeatably drilled or bored on a computer controlled milling/drilling machine or robot.

It is still a further object of the present invention to provide an improved spherical gradient lens that is relatively light in weight and is made of a material substantially free of encapsulated gases so that it may be used in an environment of low pressure or vacuum.

It is still a further object of the present invention to provide an improved spherical lens that is capable of RF power handling through subsurface radiation or internal forced air cooling.

That the present invention overcomes the drawbacks of the prior art noted above and meets the above recited objects thereof will be appreciated from the detailed description of the preferred embodiment to follow.

BRIEF DESCRIPTION OF THE DRAWINGS

FIG. 7 is a graph of the dielectric constant gradient for a preferred embodiment.

DETAILED DESCRIPTION OF THE PREFERRED EMBODIMENT

Figures 1, 2:
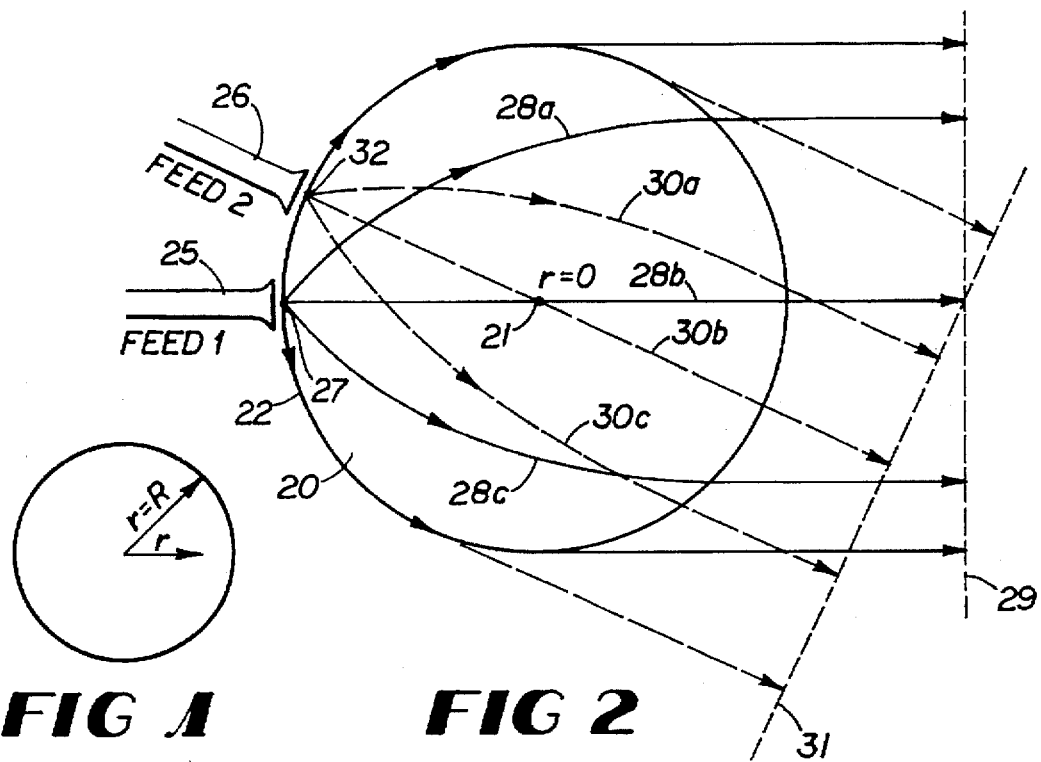
FIG. 1 is a generalized representation of a sphere of radius R showing the radial variable r used throughout this specification.
FIG. 2 is a diagram showing the colimation of beams by a Luneberg lens from two separate antenna feeds.

Turning now to the drawing figures in which like numerals represent like parts, the preferred embodiments of the lens of the present invention and the method of constructing same will now be described.

FIG. 1 is simply a graphic representation of a sphere of radius R distance units. It shows that notation used in this specification that the radial variable is, unless otherwise noted, indicated by the character "r". The lenses that are the subject of this specification use solid spheres as starting materials or reference materials in their construction.

The present invention relates to the particular class of gradient lenses that are spherical lenses having an effective dielectric constant that varied as a function of the radial variable. In other words, the effective dielectric constant at any point within the spherical lens can be determined by the distance that point lies from the center of the sphere.

While the present invention is not limited to the construction of Luneberg lenses, the desire to fabricate a better approximation of an ideal Luneberg lens was the inspiration for, and the need that led to, the present invention. As is known to those skilled in the art, ideal Luneberg lenses are a particular class of spherical gradient lenses for which the dielectric constant at any point within the sphere is given by the formula $\epsilon_r = 2-(r/R)^2$, where R is the radius of the sphere. Inspection of this equation shows that the dielectric constant is two at the center of the sphere and one at its surface, changing in accordance with the square of the radius variable.

FIG. 2 is a diagrammatic representation of the paths of electromagnetic rays through an ideal Luneberg lens 20 having a center at r=0, indicated at 21, and an outer surface indicated generally at 22. Antenna feeds 25 and 26 are designated feed 1 and feed 2, respectively. Rays of electromagnetic radiation injected on the surface of the sphere at focal point 27 follow paths indicated as 28a–28c through the sphere, as well as along surface 22 to form a collimated beam, a front of which is indicated at dashed line 29. Second feed 26 is oriented at a different angle from feed 25. The paths of rays from second feed 26 are indicated by dashed lines referenced as 30a–30c, as well as paths around surface 22 of sphere 20. The rays form a second collimated wave front indicated at 31.

Naturally, a Luneberg lens can be used as part of an antenna system with a wide field of view, i.e., basically the width of the collimated beam, is focused to a single point on the sphere opposite the wave front of the collimated beam. Therefore, any ray traveling perpendicular to wave front 29 that strikes Luneberg lens 20 will be focused at focal point 27. Likewise, a ray traveling perpendicular to wave front 31 will be focused at focal point 32.

The focusing characteristics indicated in FIG. 2 are well known focusing characteristics of a mathematical Luneberg lens. The dual feed arrangement is illustrative of an application in which the present invention is used. In particular, a near ideal Luneberg lens constructed of a uniform dielectric material with permitivity near 2 will be useful in low earth orbit satellite applications. Additionally, beam redirection accomplished by multiple feeds may be usable in a number of microwave applications, including microwave landing aids for aircraft operating under instrument flight rules.

The lens of the present invention is a sphere of solid material into which a plurality of hollowed volumes are provided, which hollowed volumes have a characteristic longitudinal axis extending normal to the surface of the sphere, and therefore radially toward the center. The cross sectional geometry of the holes as a function of distance from the center of the sphere is chosen to control the ratio of the area of holes to the area of solid material at any mathematical sphere within the physical sphere, and thereby control the local density of the sphere. The solid material of the sphere, for example the polystyrene, without considering the hollowed volumes or holes, is a uniform isotropic material of unvarying dielectric constant throughout. The composite sphere with the holes therein is, as will be explained in more detail below, an anisotropic material with a particular gradient characteristic to the dielectric constant. The gradient has an equal value along all vectors extending radially from the center of the spherical antenna.

This statement should be tempered by the obvious observation that at the microscopic level the dielectric constant is one within the holes and $\epsilon_0$ in the solid material. Thus, the statement should be understood, as it is intended, to refer to the dielectric constant of the composite drilled sphere along any vector as it affects propagation of electromagnetic radiation having wavelengths significantly longer than the largest hole radius employed in constructing the lens.

The preferred form of the method of the present invention is to provide a drill bit of appropriate geometry, and to drill a large number of relatively small diameter holes radially toward the center of the sphere to thereby manipulate the dielectric constant characteristic of the lens as a function of the sphere's radius variable r, as indicated in FIG. 1. It is relatively simple to construct uniform spheres, of unvarying dielectric constant, from materials such as high density polystyrene. Therefore, the present invention provides significantly improved approximations to the ideal Luneberg lens dielectric constant gradient characteristic as contrasted to prior art piecewise shell constructions, described hereinabove. Starting with the sphere of uniform dielectric constant material and then drilling same, the problems of fabricating resins of varying densities, as well as the problems from the discontinuities between adjacent layers in prior art Luneberg lenses, are avoided.

Starting with the assumption that the dielectric constant of the solid material from which the lens is constructed is a linear function of the density, it follows that the dielectric constant for a very thin spherical shell of such material with a plurality of holes distributed uniformly on its surface can be calculated from the percentage of the surface area of the shell that is occupied by holes. This results in the fact that the percentage of holes on such a mathematical surface is the equivalent of the percentage of removed material from the shell, and, thus, directly relates to the density of the shell. Therefore, if one judiciously selects the way in which the size of these radially extending holes vary as a function of distance from the center of the sphere, the density at each radial distance from the sphere's center can be controlled. Therefore, the dielectric constant is likewise controlled. This is the basic principle of the method of the present invention.

The fraction of the surface area of a shell occupied by holes is linearly related to the density. On the assumption that dielectric constant is linearly related to density, it follows that the fraction of the shell covered by holes linearly controls the dielectric constant. Since the dielectric constant of free space (i.e., no solid material or all holes) is unity, it will appreciated that the dielectric constant as a function of radial distance from the center of the sphere, for a drilled sphere as described above, may be expressed as:

$$\epsilon_r = \left( \frac{A_{shell} - A_{holes}}{A_{shell}} \right) \epsilon_0 + \frac{A_{holes}}{A_{shell}} \quad (1)$$

where $\epsilon_r$ is the dielectric constant at radial distance r from the center of the sphere, and $\epsilon_0$ is the dielectric constant of the solid material from which the sphere was originally constructed.

If the special case of an ideal Luneberg lens is considered, $\epsilon_0 = 2$. From this the above equation 1 may be simplified as follows:

$$\epsilon_r = 2 - \frac{A_{holes}}{A_{shell}} \quad ; \epsilon_0 = 2 \quad (2)$$

From equation 2 it follows that, if the fraction of the spherical shell area occupied by holes can be made equal to $(r/R)^2$, then the desired ideal Luneberg lens characteristic can be achieved by drilling holes that have the desirable relationship of change in size as a function of radial distance from the center of the sphere.

The inventors of the present invention have discovered that, for materials for which the density is linearly related to the dielectric constant, the appropriate characteristic for the size of the holes is a parabola in the form $$y = ar^2 \quad (3)$$

Where y is the radius of each hole at distance r from the center of the sphere. If N holes are drilled in the sphere, then the total area of the holes is simply N times the area of a circle of radius y, or $N\pi y^2$. From the well known formula for the area of a sphere, it follows that the percentage of the shell area occupied by such parabolic holes, as a function of distance from the center of the sphere, may be expressed as $$\frac{A_{holes}}{A_{shell}} = \frac{N\pi y^2}{4\pi r^2} \quad (4)$$

$$= \frac{N\pi(ar^2)^2}{4\pi r^2} \quad (5)$$

$$= \frac{N\pi a^2 r^4}{4\pi r^2} \quad (6)$$

$$= \frac{Na^2 r^2}{4} \quad (7)$$

For an ideal Luneberg lens, holes would occupy 100 percent of the area of the sphere at surface, i.e., at r=R. This may be expressed as $$1 = \frac{Na^2 R^2}{4} \quad (8)$$

From this the value of $R^2$, in terms of the number of holes and the flare parameter a for the parabolic drill, can be expressed as $$R^2 = \frac{4}{Na^2} \quad (9)$$

If equation 4 is substituted into equation 2, the following result is obtained $$\epsilon_r = 2 - \frac{Na^2 r^2}{4} \quad (10)$$

$$= 2 - \frac{Na^2 r^2}{4} = 2 - \frac{r^2}{\left(\frac{4}{Na^2}\right)}$$

Substituting equation 9 into equation 10 yields $$\epsilon_r = 2 - \frac{r^2}{R^2} = 2 - \left(\frac{r}{R}\right)^2 \quad (11)$$

From this it can be seen that, for the case of $\epsilon_0 = 2$, starting with a solid material of dielectric constant 2 and providing N radially extending holes having parabolic cross sectional geometries defined by equation 3 above, yields an overall characteristic for the dielectric constant of the drilled sphere that exactly matches the ideal Luneberg lens characteristic.

While the present invention was motivated by the desire to fabricate a near ideal Luneberg lens, those skilled in the art will appreciate the principles stated above, particularly the more general case described by equation 1 where $\epsilon_0$ does not equal 2, are useful in fabricating a wide variety of spherical gradient lenses. Furthermore, it should be noted that the derivation of the Luneberg lens characteristic described above is based on the assumption that the relative dielectric constant of the selected material is proportional to density. If the relationship between density and dielectric constant is more complex, but can still be compensated by holes having diameters that either remain constant or are monotonically increasing over the range from r=0 to r=R, then either the Luneberg lens characteristics, or other characteristics, may be changed simply by changing the cross sectional geometry of the holes as a function of radial distance from the center of the sphere.

Embodiments of the present invention may be constructed for which the cross sectional geometries of the holes employed are stepwise or piecewise continuous. In other words, there can be discontinuities in the cross section and drilling or boring tools having appropriate geometries, that will have stairstep characteristics and cross sections taken along the longitudinal axis of the bits, may be employed, as well as other techniques for removing material from the original sphere. It should furthermore be noted that, while it is convenient and most preferred, it is not required that the geometries of all holes used in a particular lens will be the same. The effective dielectric constant gradient may be controlled by interlacing holes of one geometry with holes of different geometries in order to achieve the desired results.

Figure 3:
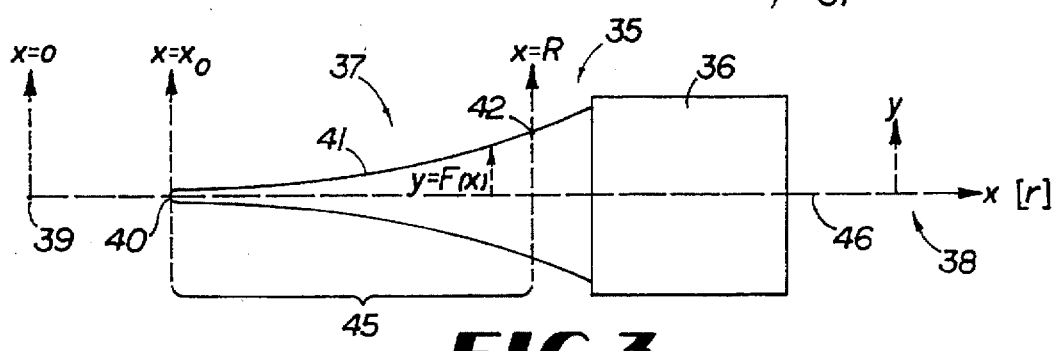
FIG. 3 is a side elevational view of the profile of a drill bit used in performing the method of the present invention.

An illustrative drill bit for use in executing the preferred embodiment of the method of the present invention is shown in FIG. 3. A drill bit, generally indicated at 35, is provided with a shank 36 for being held in the equivalent of a drill chuck and a tapered body portion 37 which includes the working surfaces thereof. The desirable grooves to guide away drilled material are not illustrated in FIG. 3. Rather, the overall geometry of the outline of the bit is shown. The reference x axis and y axis is indicated by an axis pair shown at 38 in FIG. 3. The point x=0 is indicated at 39 in FIG. 3. It should be noted that this is spaced away from the tip 40 of drill bit 35, which is mathematically located at the point $x=x_0$. The outer edge 41 follows a contour that is generally expressed as y=F(x). This indicates that the y variable is a function of the x variable. In the preferred embodiment illustrated in FIG. 3, $F(x)=ax^2$. In other words, edge 41 forms a segment of a parabola.

For a drill bit used in implementing the preferred embodiment of the method of the present invention, tapered portion 41 extends at least to a value of x=R, indicated at 42 in FIG. 3.

In the foregoing, the following should be noted. Point 39 is the point at which x is mathematically equal to zero. To construct a mathematically perfect Luneberg lens, according to the example discussed above, the tip 40 of drill bit 35 would be extended to point 39 at which its diameter vanished to zero. Since this is impractical for physical bits, a finite point $x_0$ is selected to define the physical tip of the drill bit. In a range between $x=x_0$ and x=R, indicated by bracket 45 in FIG. 3, the contour of the bit 41 follows a parabolic function for bits designed to drill ideal Luneberg lenses in materials having the stated dielectric constant to density characteristics.

In the more general case, the contour 41 is defined by a function of x, F(x), that may take on various forms, so long as same are either constant, or monotonically increasing, over all range segments lying between $x=x_0$ and x=R. In using the drill bit shown in FIG. 3 to drill a lens according to the present invention, the values of these parameters are selected such that mathematical point 39 at which y=0 would be selected so that it intersected the center of the drilled sphere, the sphere being of radius R. Thus, the absence of holes in range x=0 through $x=x_0$ is a compromise to the physical limitations of the ability to make extremely fine drill bits. As previously noted in the summary of the invention, it may be desirable in constructing embodiments of the present invention to drill some of the holes closer to, or all the way to the center of the sphere and drill others to a predetermined depth $x_0$ distance units from the center of the sphere. In the construction of such a lens, it may be desirable to employ two separate drill bits, one having a finer point and greater length for reaching the center, which bit would be used to drill a relatively small number of holes in practical embodiments of the present invention.

It should be noted that the elevational view of the bit shown in FIG. 3 is the same for all rotations of the bit about its characteristic longitudinal axis, indicated at 46 in FIG. 3. Thus, it should be understood that the holes drilled by the bit are circular in cross sections perpendicular to longitudinal axis 46. It should also be noted that in preferred embodiments of the present invention, the flare of the drill bits used will be very small. Thus, it should be understood that FIG. 3 is provided to illustrate the principles involved, and not to represent a proportionally scaled diagram of a physical drill bit that would be used in most practical embodiments of the present invention. Indeed, it is believed that the parameter a in the parabolic description of contour 41 will be small and that the flare will be slight.

Figures 4, 5, 5A:
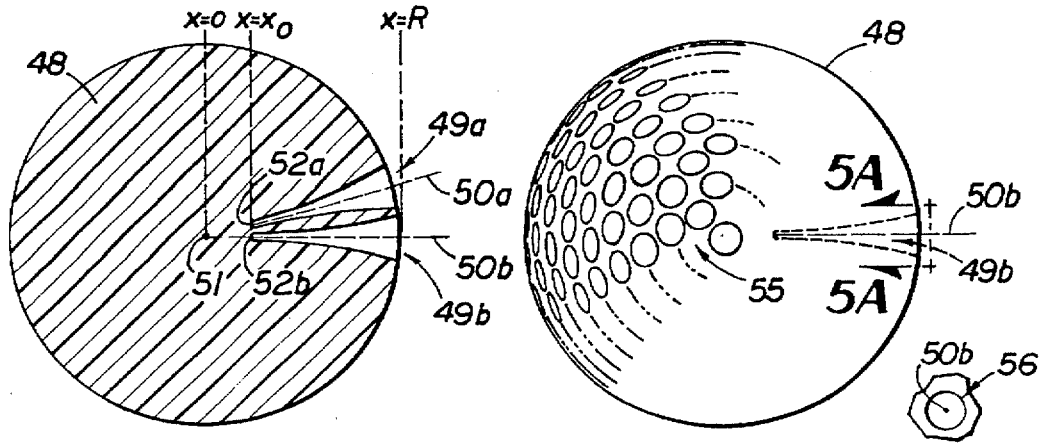
FIG. 4 is a cross sectional area showing two typical holes, although not to scale, in an embodiment of the present invention.
FIG. 5 is a pictorial view of a gradient lens according to the present invention showing drilled holes over a portion of the surface thereof and one such hole in phantom.

FIG. 4 shows a cross section of a sphere 48 of uniform isotropic material of uniform dielectric constant, that is used as a starting materials, with two exemplary holes, indicated at 49a and 49b, drilled therein. The holes 49 have respective longitudinal axes 50a and 50b extending radially toward center 51 of sphere 48. It should be understood that the illustrated holes 49 were drilled using a drill bit of the type shown in FIG. 3 and thus the holes extend from points located at $x=x_0$, shown as 52a and 52b, respectively, to points on the surface of sphere 48 for which x=R. Note that the x variable in the above statements is defined as a vector extending radially from center 51 of sphere 49 toward the surface of the sphere. Holes 49a and 49b constitute hollowed volumes having respective characteristic longitudinal axes 50 extending radially from sphere 48. It should be understood that other similar holes would be drilled at various locations so as to be distributed uniformly about the surface of sphere 48. The closer that the point $x=x_0$ can be brought to center 51 of the sphere, the more closely the resultant dielectric gradient characteristics will correspond to the desired ideal gradient characteristics.

FIG. 5 shows a pictorial view of sphere 48 with a relatively small cluster of holes, indicated at 55. Hole 49b is also illustrated in FIG. 5. A cross sectional view of hole 49b is indicated at 56 in FIG. 5 wherein it can be seen that longitudinal axis 50b is located at the center of the circular cross section of hole 49b. Cluster 55 is illustrated simply to show a portion of the sphere that is covered with holes for which a relatively large percentage of the surface is occupied by holes at the outer surface of sphere 48. Thus, it should be understood that the physical appearance of an embodiment of the present invention would have holes similar to cluster 55 distributed substantially uniformly over the entire surface of the sphere. Also, from inspection of FIGS. 4 and 5 together, it would be appreciated that in an approximation to a Luneberg lens constructed using the present invention, the percentage of area occupied by holes goes from a value of zero at the center of the sphere to a relatively large percentage at the surface of the sphere, i.e., at x=R.

Next, consider the physical implementation of an embodiment of the present invention using real material. The high density irradiated polystyrene, such as that sold by Dupont Corporation under trademark Rexolite, has a dielectric constant of about 2.5. In order to approximate a Luneberg lens, it is desirable to have the value of the dielectric constant near the center be equal to two and to the have the fraction of the shell occupied by holes as close to unity as is practical at the surface of the sphere, i.e., at x=R in the notation adopted in this specification.

Figure 6:
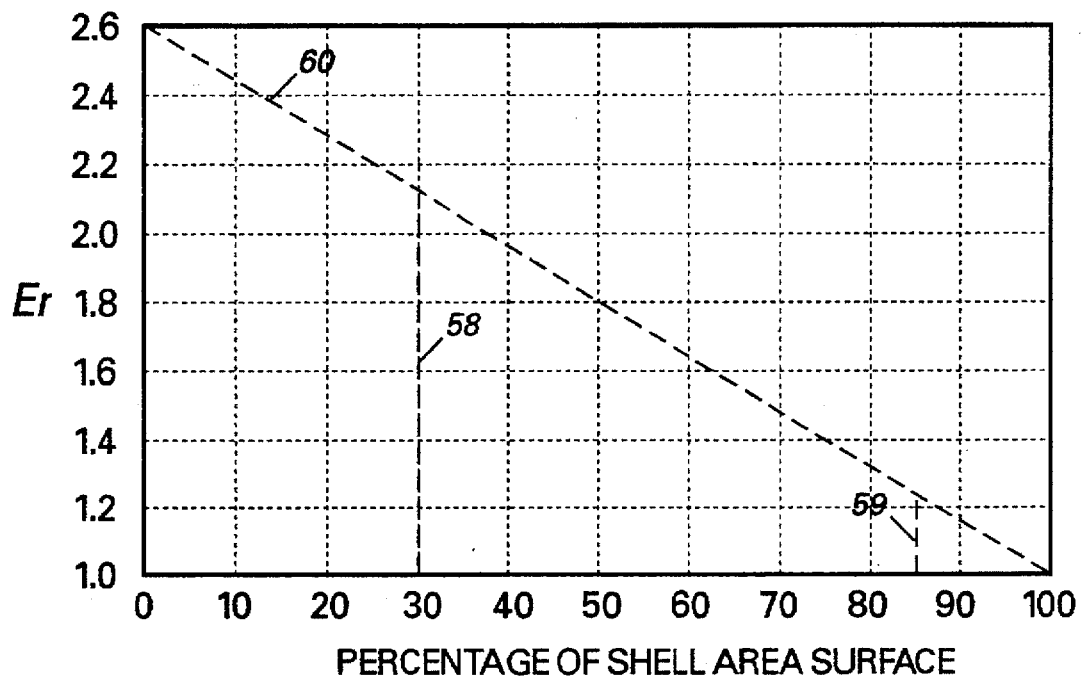
FIG. 6 is a graph of the dielectric constant versus a percentage of holes for the high density irradiated polystyrene material used in the preferred embodiment, based on an assumption of a linear relationship between dielectric constant and material density.

FIG. 6 is a graph showing $\epsilon_r$ on the vertical axis as a function of the percentage of the surface of a shell occupied by holes on the horizontal axis per equation 1 above. As is indicated at dashed line 58, a dielectric constant of two is achieved at about twenty eight percent of the shell area being occupied by holes. Dashed line 59 shows that, at eighty five percent of the shell being occupied by holes, the dielectric constant is approximately 1.2. Since it is impractical to drill holes so that the entire surface is occupied by holes at x=R, it is believed that spherical surface hole percentages between eighty five and ninety percent are usable in constructing practical embodiments of the present invention. Eighty five percent is selected as an illustrative example herein. It should be noted that the relationship illustrated in FIG. 6 is based on the assumption that the relative dielectric constant of a drilled sphere of Rexolite is proportional to its density. If the relationship is other than proportionality, the shape of the dashed line characteristic 60 would be different. However, so long as it is no more complex than a second order function of the density, an equation in the form $F(x)=ax^p$ where p is greater than zero and less than or equal to two can be used to construct a drill bit as illustrated in FIG. 3 to control the change in relative dielectric constant so as to maintain same as constant, or monotonically decreasing, from the center of the sphere toward the surface.

As noted above, the contour of holes in the present invention may be expressed as at least piecewise continuous segments of functions having the form:

$$\sum_{i=0}^{i=n} b_i x^i$$

From the foregoing, it should be apparent that both forms in which the drill bit geometry expressed as a sum of powers of x, as well as continuous or piecewise continuous forms having noninteger powers of x, may be used in embodiments of the present invention.

It should further be noted that embodiments of the present invention do not require that all holes be provided to identical depths or with identical cross sectional geometries. Thus, embodiments of the present invention are possible, and can be designed with the information provided in this specification, for which at least one set of holes in the sphere goes to a particular depth with one or more predetermined cross sectional geometries, and a second set of interstitial holes as provided to a shallower depth, with either the same or differing cross sectional geometries, interlaced between the first mentioned set of holes. This second set may be considered interstitial holes for finer tuning of the desired gradient characteristics. Such interstitial holes may even be drilled to varying depths themselves. It is believed that such interstitial holes would be particularly useful for more closely approximating the mathematical desired unity ratio of $A_{holes}/A_{shell}$ at the surface of the sphere. This can provide a better match between the dielectric constant of free space or air and of the surface of the lens.

Figure 7:
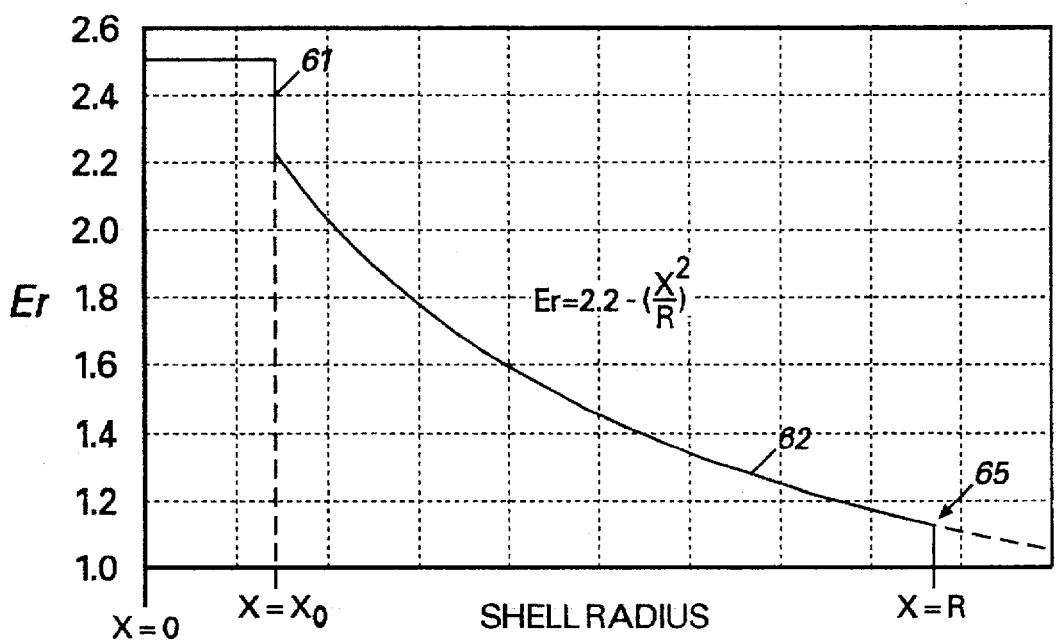
FIG. 7 is a graph of the dielectric constant characteristic of a preferred embodiment of the present invention as a function of radius. Thus.

FIG. 7 illustrates the dielectric constant characteristics of a physical approximation to a Luneberg lens constructed according to the present invention using Rexolite brand polystyrene. It should be understood that the physical device whose characteristics are illustrated in FIG. 7 is constructed as shown in FIGS. 4 and 5, described hereinabove. At the center of the sphere, i.e., x=0, the dielectric constant is equal to 2.5, the dielectric constant of the Rexolite material. The tips of the drill bits used (i.e., tip 40 as shown in FIG. 3) extend radially toward the center of the sphere to a distance $x_0$ away from the center. Since all of the holes made by the tips have a finite area, there is a stepwise drop, shown at 61, in the dielectric constant characteristic that takes it to approximately 2.2 at a shell of radius r=$x_0$. In the range between this value and the surface of the sphere at x=R, the dielectric constant gradient characteristic follows the desired Luneberg lens characteristic, as illustrated at 62 in FIG. 7. At x=R, which point is referenced at 65 in FIG. 7, the dielectric constant is approximately 1.2 and the percentage of holes on the surface is approximately eighty five percent.

The example shown in FIGS. 6 and 7 demonstrates that a practical physical embodiment of the device illustrated in FIGS. 4 and 5 can be built using a real polystyrene material, such as Rexolite, with a large range of radial distances for the sphere over which it very closely tracks an ideal Luneberg lens characteristic. There is only a slight mismatch (1.2 to 1.0) between the dielectric constant at the surface of the sphere and the dielectric constant of free space or air.

At a relatively microscopic level, it should be understood that a drilled sphere of the type described herein is actually a matrix of holes for which the dielectric constant is approximately one, and surrounding solid material for which the dielectric constant is $\epsilon_0$, 2.5 in the case of the Rexolite polystyrene. In order to minimalize this effect, it is important to keep the diameter of the holes such that it is much smaller than the shortest wavelength of interest in the effective dielectric medium in the spectrum of interest with which the lens will be used. Thus, radiation having a wavelength substantially longer than the hole diameter will respond to the drilled sphere as if it were a locally uniform material having a dielectric constant determined by the local density, i.e., the percentage of shell area occupied by holes.

To illustrate a real example, consider a Rexolite sphere having a radius of 2.5 inches. In order to meet that criteria, assume that the diameter of the holes is chosen to be 0.125 inches at the surface of the sphere. Therefore, the radius of the holes at the surface is equal to 0.0625 inches. Solving equation 3 for a at r=R yields a value for a of 0.01. This value at r=R may be substituted into equation 7 above with the equation set to the fraction of the shell area occupied by holes being equal to 0.85. Equation 7 can then be solved for the value of N, which turns out to be 5440. Thus, by drilling approximately 5000 holes in a sphere of radius 2.5 inches of Rexolite material, a practical, excellent approximation to an ideal Luneberg lens can be constructed. The value of the field of view and the bandwidth of interest will determine R according to above referenced methodology. So long as the flare parameter a is chosen judiciously so as to make the radius at r=R for each hole much smaller than the shortest wavelength of interest, the number of holes needed to achieve the desired fraction of the surface of the sphere to be occupied by holes can be calculated as described hereinabove.

There are well known algorithms for distributing holes and dimples on the surfaces of spheres that can be and are used to control computer numerically controlled machines. For example, it is common to find numbers of dimples automatically placed on the surface of a golf ball in the order of 400. Similarly, approximately 14,000 dimples are regularly placed on the surface of spheres the size of basketballs using such known methodology Another material, which the inventors believe may have the most desirable characteristics for constructing embodiments of the present invention as known to them as of the filing of this specification has also been identified. A material known as TPX, currently sold by Mitsui Plastics, Inc. of White Plains, N.Y., is a methylpentene copolymer in the polyolefin family. It is injection and blow moldable. It is nonhydroscopic and has a melting point in the order of 230° to 240° C. It is nonsoluable in water and has a specific gravity in the range 0.83 to 0.84. The inventors have measured the relative dielectric constant of TPX to be on the order of 2.1. Turning to FIG. 7, it will be appreciated that the fact that the relative dielectric constant of TPX is closer to 2 lends itself to construction of a Luneberg lens according to the present invention that more closely approximates the ideal dielectric constant gradient characteristics.

Figure 8:
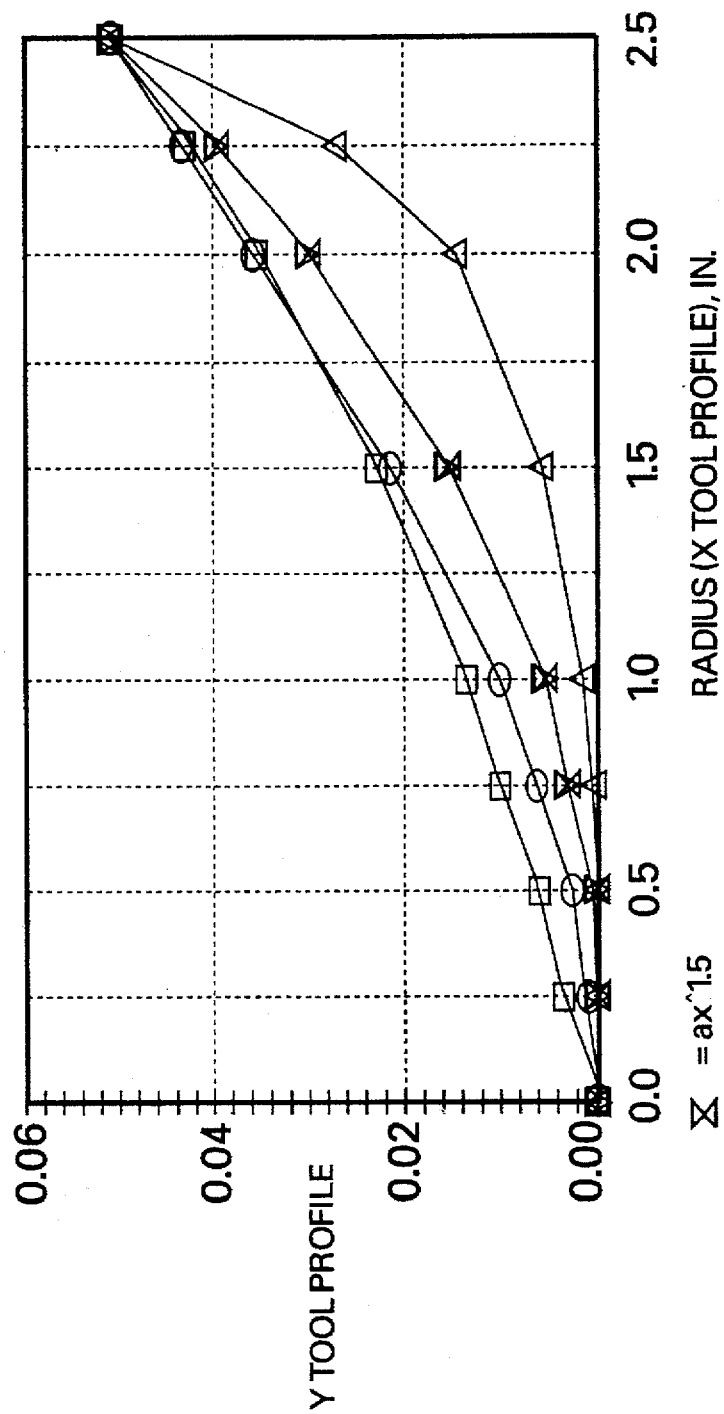
FIG. 8 is a graph of several tool profiles with drill bits used in performing the method of the present invention.
Figure 9:
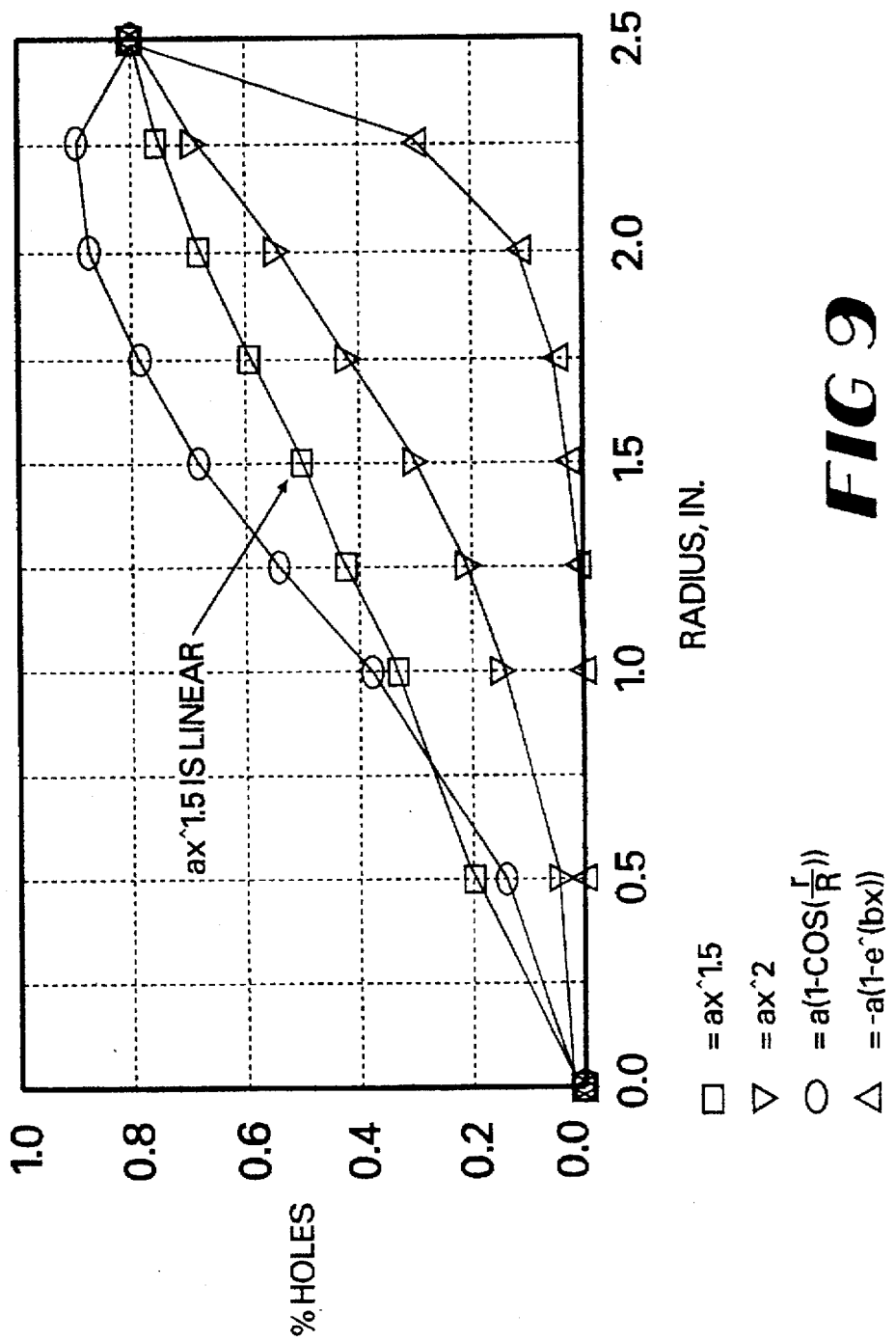
FIG. 9 is a graph showing the percentage holes in the shells of a two and a half inch sphere for holes made using the tools having the profiles depicted in FIG. 8.

FIGS. 8 and 9 illustrate the more general applicability of the present invention. The phrase more general applicability falls into two specific categories. The first is utility in constructing Luneberg lenses from starting materials having dielectric constant to density relationships other than proportionality. The second aspect of this general applicability is the ability to construct spherical gradient lenses of varying dielectric constant gradient characteristics from spheres of starting materials having either proportional or nonproportional dielectric constant to density characteristics.

FIG. 8 illustrates the values of hole radius, i.e., the variable y, for tool profiles for which y=F(x) as generally illustrated in FIG. 3. Profiles for five different functions of x are illustrated for the example of a bit designed to drill a two and one half inch radius sphere. The inverted triangle curve is that used for Luneberg lens case for a proportional dielectric constant to density characteristic. The curve shown for $$F(x) = a\left(1 - \cos\left(\frac{x}{R}\right)\right)$$

is for the argument of the cosine function being expressed in radians.

The fifth tool profile represented on FIG. 8 (denoted by the rectangular box) is one generated for an approximation of an ideal Luneberg lens taking into account second order effects of the relationship between relative dielectric constant and material density that are described herein below. It is a graph of a tool profile for drilling an ideal Luneberg lens, the tool profile being defined by equation 26, below.

FIG. 9 illustrates the fraction of holes as a function of radius for the two and one half inch radius sphere for holes drilled using tools (per FIG. 3) having the tool profiles shown in FIG. 8. Note that for the general exponential case of $F(x)=ax^p$, setting $p=1.5$ causes the percentage of holes to vary linearly with the radius variable r. This can be used to construct gradient lenses with linear dielectric constant gradients from the center toward the surface from starting materials for which the dielectric constant to density characteristic is proportional. FIG. 9 further illustrates that characteristics falling both above and below the linear curve may be made from tools having profiles that meet the monotonicity characteristic required to allow physical drilling of the holes. Therefore, for solid spheres of materials having nonproportional dielectric constant to density characteristics, once a reasonable mathematical (or graphical) approximation of the dielectric constant to density characteristic is obtained, an appropriate tool profile may be designed for a drill bit used to drill a sphere of such material to give the desired dielectric constant gradient characteristic, either a Luneberg lens characteristic, or some other desired characteristic.

From the foregoing description of the preferred embodiment, it will appreciated that both the lens of the present invention, and the method of constructing same, overcome the drawbacks of the prior art and meet the objects of the present invention recited hereinabove. Among additional advantages obtainable using the present invention are the ability to use materials that are transparent at infrared wavelengths that allow heat to be radiated from the lens. Additionally, it is possible to interconnect a large number of the drilled holes near the tip ends so as to provide an air path. Air can be injected into one or more feed holes and used to provide forced air cooling of the lens when desired.

The present inventors have also analyzed the problem of controlling the gradient of relative dielectric constant to consider second order effects. The above referenced description of an assumed linear relationship between material density and relative dielectric constant gives a very good approximation of the desired characteristics. The inventors believe that taking into account second order effects will give a better approximation. It also turns out that it yields a tool profile with a somewhat lesser flare for drilling a sphere to approximate an ideal Luneberg characteristic. Thus, it should be understood that application of the analysis for the second order effects is not considered essential to practice of the present invention, but is believed to yield superior results in the ultimately fabricated lens.

The point of departure for this analysis is the well known Dale-Gladstone law from optics which states:

$$\eta - 1 = k\rho \tag{12}$$

Where $\eta$ is the index of refraction, k is a constant and $\rho$ is the density of the material. The Dale-Gladstone law was derived in the field of optics, i.e., behavior of electromagnetic radiation in the visible light frequencies. Since the index of refraction is equal to the square root of the relative dielectric constant, the Dale-Gladstone law can be alternately expressed as:

$$\epsilon_r = (1+k\rho)^2 \tag{13}$$

The inventors tested the hypothesis that the value of k would hold for microwave frequencies. Calculating a predicted relative dielectric constant for Rexolite determined that the Dale-Gladstone law using the conventional value for the constant k in the Dale-Gladstone law was incorrect. Using known values for the density of Rexolite and its relative dielectric constant, a value of k was calculated to be 0.5655 cubic centimeters per gram. Having derived this value, it was tested with respect to a number of materials with known physical densities and relative dielectric constants at microwave frequencies. The inventors determined that there was excellent agreement with the modified Dale-Gladstone law for Rexolite, TPX, and a number of high density polypropylene materials. This agreement was valid over a frequency range from a few gigahertz to almost 100 gigahertz. Note that the Dale-Gladstone law is modified to the extent of derivation of the new value for k that is different from the recognized value used in optics.

As noted herein above, the average density of a thin shell of a drilled sphere, as described herein above, is related to the ratio of the area of holes to the area of the sphere. If the ratio of the area of the holes to that of the shell is designated as A' then the physical density of the material at a given shell is given by the expression:

$$\rho = (1-A')d_0 \tag{14}$$

where $d_0$ is the physical density of the undrilled host material. As before, the density ρ is an average density for the material of a shell a given distance from the center of sphere. So long as the constraint of the wavelength of highest electromagnetic frequency of interest being longer than the diameter of the largest hole is maintained, a lens constructed from a drilled sphere will behave as if the density of the material was uniformly changing on a microscopic level.

Since equation 13 relates dielectric constant to density and equation 14 relates the density of a drilled sphere to the ratio A' and the physical density of the native material, substituting equation 14 into equation 13 yields a relationship between the relative dielectric constant and the hole/shell area ratio A' of:

$$\epsilon_r = (1 + k(1-A')d_0)^2 \tag{15}$$

Applying the Dale-Gladstone law to the native material yields the expression:

$$kd_0 = \eta_0 - 1 \tag{16}$$

That may be alternately expressed as:

$$kd_0 = \sqrt{\epsilon_{r0}} - 1 \tag{17}$$

where $\epsilon_{r0}$ is the relative dielectric constant of the host material. This can be solved to yield an expression of the constant k from the modified Dale-Gladstone law in terms of characteristics of the host material as follows:

$$k = \frac{\sqrt{\epsilon_{r0}} - 1}{d_0} \tag{18}$$

Solving equation 15 for A' then substituting equation 18 for the value of k yields an expression that simplifies to:

$$A' = \frac{\sqrt{\epsilon_{r0}} - \sqrt{\epsilon_r}}{\sqrt{\epsilon_{r0}} - 1} \tag{19}$$

which expresses the hole to shell area ratio, or fill factor, in terms of the relative dielectric constant at the shell and the relative dielectric constant of the host material.

Substituting equation 18 into equation 15 yields:

$$\epsilon_r = [1 + (\sqrt{\epsilon_{r0}} - 1)(1 - A')]^2 \tag{20}$$

which indicates that the relative dielectric constant at a particular shell bares a quadratic relationship to the fill factor A', since the A' term is squared. This indicates that there is indeed a second order effect to be considered in the modeling of the relationship between fill factor and relative dielectric constant for a drilled sphere.

$$\epsilon_r = 2 - \left(\frac{r}{R}\right)^2 \tag{21}$$

Equation 21 above restates the relative dielectric constant characteristic for an ideal Luneberg lens using the same convention for variables adopted elsewhere in this specification. Substituting equation 21 into equation 19 above yields:

$$A' = \frac{\sqrt{\epsilon_{r0}} - \sqrt{2 - \left(\frac{r}{R}\right)^2}}{\sqrt{\epsilon_{r0}} - 1} \tag{22}$$

From the definition of the fill factor A' it is readily appreciated that the area of the holes at a given shell r distance units away from the center of a sphere may be expressed as:

$$A_{holes} = A' 4\pi r^2 \tag{23}$$

From this, the area of an individual hole, $A_{hole}$, for a drilled sphere having N holes of the same radius may be expressed as:

$$A_{hole} = \frac{A_{holes}}{N} = \frac{A' 4\pi r^2}{N} = \pi r_h^2 \tag{24}$$

Where $A_{holes}$ is the total hole area at the shell, r is the distance from the center of the sphere for the shell in question, and $r_h$ is the radius of the hole at distance r from the center of the sphere. Manipulating the two right hand terms of equation 24 to solve for A' and substituting this into equation 22 above yields an expression that may be solved for the $r_h$ as follows:

$$r_h = \sqrt{\left(\frac{4r^2}{N}\right)\left(\frac{\sqrt{\epsilon_{r0}} - \sqrt{2 - \left(\frac{r}{R}\right)^2}}{\sqrt{\epsilon_{r0}} - 1}\right)} \tag{25}$$

Algebraic simplification leads to the following expression for the radius of the hole, and thus the geometry appropriate for a drill bit is a function of distance from the center of the sphere r:

$$r_h = \frac{2r}{\sqrt{N}} \sqrt{\frac{\sqrt{\epsilon_{r0}} - \sqrt{2 - \left(\frac{r}{R}\right)^2}}{\sqrt{\epsilon_{r0}} - 1}} \tag{26}$$

Since, for a given drilled sphere of a given material, N, R, and the relative dielectric constant of the host material are constants, values for the radius of an individual hole as a function of distance from the center of sphere may be solved readily for various points between r=0 and r=R to provide an indication of the appropriate cross sectional geometry for a drill bit, i.e., the hole itself.

One of the curves shown in FIG. 8 shows a plot of the hole radius for the example of a Rexolite sphere using equation 26 evaluated with a general purpose digital computer running a spread sheet application.

One minor modification to equation 26 is also within the scope of the present invention. For holes that are drilled or otherwise fabricated in a sphere, it has been noted above that it is impractical to construct drill bits with tip radii that vanish smoothly to zero. Furthermore, the center of a sphere of physical material would crumble if a large number of holes were drilled all the way to the center. In order to accommodate this, it should be understood that many practical embodiments of the present invention are ones for which equation 26 will describe the radius, $r_h$, of each hole over a range from $r_0$ to R where $r_0 > 0$. For values of r in the range 0 to $r_0$, $r_h = 0$. In other words, the radius of each hole is equal to zero over a range of radii from r=0 to r=$r_0$, and is given by equation 26 for values greater than $r_0$. As is the case that is illustrated in connection with FIG. 7, the dielectric constant characteristic near the center of the sphere will have a flat portion that is equal to the dielectric constant of the host material and will then start decreasing in a manner that approximates the ideal Luneberg lens characteristic.

The analysis of the hole contour as a function of distance from the center of the spherical lens for non-ideal Luneberg lenses (with loci off the spherical surface) can be made by those skilled in the art by using a description of the desired gradient characteristic of the relative dielectric constant for such a lens instead of equation 21 above, substituting such a description into equation 19 and following the methodology described above in a straight forward manner. Naturally, such methodology can be used to derive hole contours for a lens having any gradient characteristic, although some such contours may not be manufacturable, as a practical matter, at the present time.

Inspection of equation 26 shows that the hole radius ($r_h$) is expressed as a function of radial distance from the center of the sphere (r) and can be solved if the radius of the sphere itself (R), the relative dielectric constant of the host material ($\epsilon_{ro}$) and the number of holes (N) are known. While there are a number of ways in which the number of holes may be selected, the following provides a methodology for selecting the number of holes, i.e., the value for N.

In order to meet the constraint that the drilled sphere appear as if it were a continuous medium to the electromagnetic radiation of interest, the maximum hole size (i.e., at the surface of the sphere) should be small compared to the shortest wavelength in the frequency range of interest. A practical upper limit on the hole size is the shortest wavelength of interest divided by the index of the fraction plus one. This value can be referred to as the maximum spacing $S_m$.

To uniformly distribute the holes in an orderly manner, analysis developed by Buckminster Fuller is employed. Fuller analyzed the number of equally spaced vertices that may be drawn between points on the surface of an icosahedron and the center thereof. The number of vertices is given by:

$$V = 10F^2 + 2 \tag{27}$$

where V is the number of vertices and F is the subdivision frequency. The subdivision frequency is the number of segments into which each edge of the equilateral triangles forming the surface of the icosahedron are divided. As is well known, the icosahedron is the regular solid polygon having the maximum number of faces. Each face of a regular icosahedron is equilateral triangle. Therefore, the number of vertices drawn to the points at which the edges of the faces intersect on an icosahedron corresponds to a subdivision frequency of one. Equation 27 yields twelve vertices for F=1.

If each edge of the equilateral triangles of the icosahedral surface is divided into two segments, and vertices are drawn to both the intersections of the edges of the triangular faces and the midpoints of the edges, the subdivision frequency is two, and forty two vertices result from equation 28. Similarly, if the edges of the triangular faces are trisected, ninety two vertices result. The icosahedron approximates a sphere and this mathematical analysis may be used to determined the number of circles that may be placed on the surface of a sphere where the centers of the circles are collocated with the vertices.

The angle between adjacent vertices $\Theta_F$ is approximately 63.435° divided by F, the subdivision frequency, i.e.:

$$\Theta_F = 63.435°/F. \tag{28}$$

Since this is the angular distance between regularly spaced vertices, it follows that the radius of the sphere R, times the angle $\Theta_F$ (expressed in radians) should equal $S_m$, the maximum diameter of a hole at the surface according to the electromagnetic constraints:

$$S_m = \Theta_F R \tag{29}$$

This relationship is easily solved for $\Theta_F$ in radians. Converting this to degrees and substituting it into equation 28 yields a solution for the subdivision frequency F. This should preferably be truncated to the nearest integer part. The truncation assures that the number of holes selected will be such that they will not intersect each other and thus cause the surface of the sphere to crumble.

Once the subdivision frequency is obtained from this, the number of vertices is obtained from equation 27 and this is set equal to N, the number of holes. Therefore, N as used in equation 26 is derived from the electromagnetic constraint that the maximum hole size of the surface of the sphere be small compared to the shortest wavelength of interest. Naturally, the number of holes can be increased, but this normally leads to a requirement for finer operations to form each hole.

Figure 10:
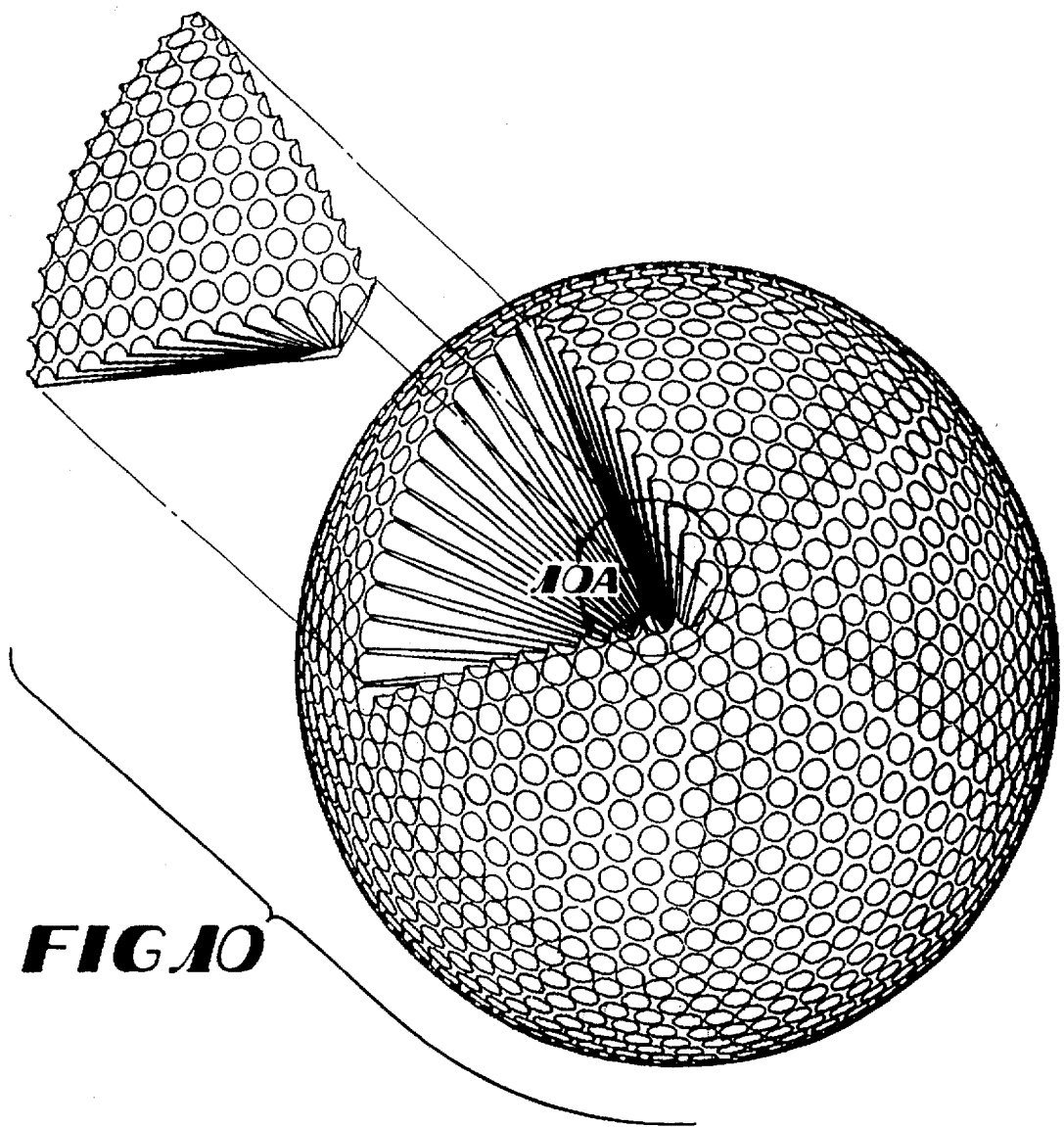
FIG. 10 is a pictorial view of an embodiment of the lens of the present invention with a portion broken away and a portion shown in detail.
Figure 10A:
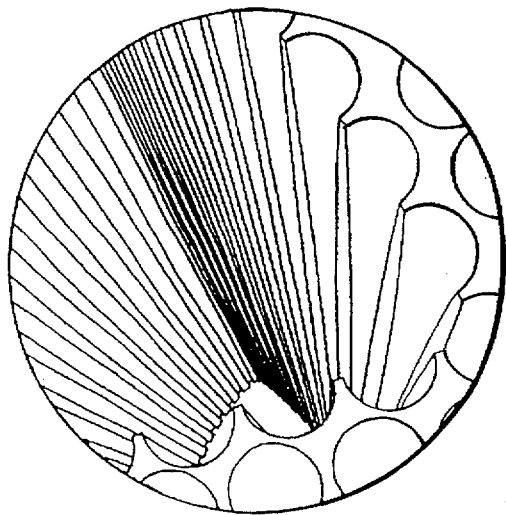

FIG. 10 shows a pictorial view of an embodiment of the present invention made according to the above described methodology. A portion is broken away, and a detail is provided thereon. The example illustrated in FIG. 10 is a sphere that is five inches in diameter with N=1692.

From the foregoing description of the preferred embodiments of the lens of the present invention and the method of constructing same, other embodiments of the invention will suggest themselves to those skilled in the art. Therefore, the scope of the present invention is to be limited only by the claims below and equivalents thereof.

What is claimed is:

1. An improved spherical lens comprising in combination:
    a spheroid of a solid material having a plurality of hollowed volumes disposed therein, said solid material being a substantially uniform, isotropic material with a uniform relative dielectric constant throughout; and
    each of said hollowed volumes having a respective characteristic longitudinal axis extending radially from the center of said spheroid.

2. An improved spherical lens as recited in claim 1 wherein:
    each of said hollowed volumes has a predetermined cross sectional geometry in planes perpendicular to its said respective characteristic longitudinal axis as a function of the distance of said planes from said center of said spheroid.

3. An improved spherical lens as recited in claim 2 wherein:
    said predetermined cross sectional geometry is a circle centered about said respective characteristic longitudinal axis having a diameter that increases parabolicly with said distance from said center of said spheroid.

4. An improved spherical lens as recited in claim 2 wherein:
    said predetermined cross sectional geometry is a circle centered about said respective characteristic longitudinal axis having a diameter that increases linearly with said distance from said center of said spheroid.

5. An improved spherical lens as recited in claim 2 wherein:
    said predetermined cross sectional geometry is defined by a formula $r_h=a(r-r_0)^p$ wherein:

$r_0$ is a constant distance from said center of said spheroid, greater than or equal to zero;

r is a distance from said center of said spheroid, greater than or equal to $r_0$;

a is a constant greater than zero;

p is a constant greater than zero; and $r_h$ is a radial distance from said respective characteristic longitudinal axis at a point r distance units from said center of said spheroid.

6. An improved spherical lens as recited in claim 2 wherein:

said predetermined cross sectional geometry is defined by a formula $r_h=F(r)$ wherein:

r is a distance from said center of said spheroid;

$r_h$ is a radial distance from said respective characteristic longitudinal axis at a point r distance units from said center of said spheroid;

F(r) is a constant or monotonically increasing function of r for all intervals between r=0 and r=R, R being the radius of said spheroid.

7. An improved spherical lens as recited in claim 5 wherein:

said spherical lens has a radius R at its outer surface and is for use with a predetermined spectrum of interest having a characteristic shortest wavelength L;

p equals two; and the value of a is chosen so that, at r=R, $r_h$ is much less than L.

8. An improved spherical lens as recited in claim 6 wherein:

$$F(r) = \frac{2\pi}{\sqrt{N}} \sqrt{\frac{\sqrt{\epsilon_{r0}} - \sqrt{2-\left(\frac{r}{R}\right)^2}}{\sqrt{\epsilon_{r0}} - 1}}$$

wherein:

N is the number of said hollowed volumes; and $\epsilon_{r0}$ is said uniform relative dielectric constant.

9. An improved spherical lens as recited in claim 6 wherein:

wherein:

$r_h=0$ for the range r=0 to r=$r_0$ and $r_h=F(r)$ for the range r>$r_0$ to r=R, where $r_0$ is a constant greater than zero, and less than R.

10. An improved spherical lens as recited in claim 2 wherein said uniform dielectric constant is substantially equal to 2.5.

11. An improved spherical lens as recited in claim 2 wherein said uniform dielectric constant is substantially equal to 2.1.

12. A method of constructing an improved spherical lens comprising the steps of:

providing a spheroid of substantially uniform, isotropic material with a uniform relative dielectric constant throughout;

forming a plurality of holes within said spheroid, each of said holes having a respective characteristic longitudinal axis extending radially from the center of said spheroid and a predetermined cross sectional geometry in planes perpendicular to its said respective characteristic longitudinal axis as a function of the distance of said planes from said center of said spheroid.

13. A method of constructing an improved spherical lens as recited in claim 12 wherein:

said spheroid has a radius R;

said step of forming said plurality of holes forms holes over a range of distances from said center of said spheroid between $r_0$ and R for which said predetermined cross sectional geometry is defined by a formula $r_h=a(r)^p$ wherein:

$r_0$ is a constant distance from said center of said spheroid, greater than or equal to zero;

r is a distance from said center of said spheroid, greater than or equal to $r_0$;

a is a constant greater than zero;

p is a constant greater than zero; and $r_h$ is a radial distance from said respective characteristic longitudinal axis at a point r distance units from said center of said spheroid.

14. A method of constructing an improved spherical lens as recited in claim 12 wherein:

said spheroid has a radius R;

said predetermined cross sectional geometry of each of said holes is given by:

$$r_h = \frac{2r}{\sqrt{N}} \sqrt{\frac{\sqrt{\epsilon_{r0}} - \sqrt{2-\left(\frac{r}{R}\right)^2}}{\sqrt{\epsilon_{r0}} - 1}}$$

wherein:

$r_h$ is the radius of each said hole;

N is the number of said holes in said spheroid; and $\epsilon_{r0}$ is said uniform relative dielectric constant.

15. A method of constructing an improved spherical lens as recited in claim 12 wherein said step of forming said plurality of holes is a step of drilling said plurality of holes.

16. A method of constructing an improved spherical lens comprising the steps of:

providing a spheroid having a radius R of substantially uniform, isotropic material with a uniform dielectric constant throughout;

providing at least one drill bit with a characteristic longitudinal axis having a predetermined cross sectional geometry in planes perpendicular to said characteristic longitudinal axis over a range from r=$r_0$ to r=R defined by a formula:

$r_h=a(r)^p$ wherein:

$r_0$ is a constant greater than zero defining a tip end of said drill bit;

r is a distance measured along said longitudinal axis from a point at which $r_h=0$ according to said formula, r being greater than or equal to $r_0$;

a is a constant greater than zero;

p is a constant greater than zero; and $r_h$ is a radial distance from said characteristic longitudinal axis at point r distance units from said point at which $r_h=0$ according to said formula;

using said drill bit to drill a predetermined number of holes radially towards the center of said spheroid so that said point at which $r_h=0$ according to said formula intersects said center of said spheroid.

17. A method of constructing an improved spherical lens as recited in claim 16 wherein p equals two.

18. A method of constructing an improved spherical lens as recited in claim 16 wherein p equals 1.5.

19. A method of constructing an improved spherical lens comprising the steps of:

providing a spheroid having a radius R of substantially uniform, isotropic material with a uniform dielectric constant throughout;

providing at least one drill bit with a characteristic longitudinal axis having a predetermined cross sectional geometry in planes perpendicular to said characteristic longitudinal axis over a range from $r=r_0$ to $r=R$ defined by a formula:

$r_h=aF(r)$ wherein:

$r_0$ is a constant greater than zero defining a tip end of said drill bit;

r is a distance measured along said longitudinal axis from a point at which $r_h=0$ according to said formula, r being greater than or equal to $r_0$;

a is a constant greater than zero;

F(r) is a monotonically increasing function of r; and $r_h$ is a radial distance from said characteristic longitudinal axis at a point r distance units from said point at which $r_h=0$ according to said formula;

using said drill bit to drill a predetermined number of holes radially towards the center of said spheroid so that said point at which $r_h=0$ according to said formula intersects said center of said spheroid.

20. A method of constructing an improved spherical lens as recited in claim 19 wherein $$F(r) = \left(1 - \cos\left(\frac{r}{D}\ \frac{\pi}{2}\right)\right)$$

where D is equal to 2R.

21. A method of constructing an improved spherical lens as recited in claim 19 wherein $F(r)=1-e^{(-br)}$ where b is a constant greater than zero.

22. A method of constructing an improved spherical lens as recited in claim 19 wherein:

$$F(r) = \sum_{i=0}^{i=n} b_i r^i$$

$b_i$ is a constant for each value of i; and i takes on integer values between 0 and a predetermined maximum number n.

23. An improved spherical lens as recited in claim 2, wherein:

said predetermined cross sectional geometry is defined by a formula $$r_k = \sum_{i=0}^{i=n} b_i r^i$$

wherein:

$b_i$ is a constant for each value of i; and i takes on integer values between 0 and a predetermined maximum number n.

24. A method of constructing an improved spherical lens as recited in claim 19 wherein:

$$F(r) = \sum_{i=0}^{i=n} b_i r^{p_i}$$

wherein:

$b_i$ is a constant for each value of i; and $p_i$ is a positive number for each value of i.

* * * * *